United States Patent [19]

Staahl, Jr. et al.

[11] 4,004,900
[45] Jan. 25, 1977

[54] MANUFACTURE OF FLAT GLASS AT CONTROLLED THROUGHPUT RATE

[75] Inventors: Joseph R. Staahl, Jr., Conneaut Lake; Joseph M. Matesa, Pittsburgh; David E. Worth, Atlantic, all of Pa.

[73] Assignee: PPG Industries, Inc., Pittsburgh, Pa.

[22] Filed: Sept. 19, 1975

[21] Appl. No.: 614,829

[52] U.S. Cl. .................... 65/29; 65/65 A; 65/99 A
[51] Int. Cl.² .......................... C03B 18/02
[58] Field of Search ............ 65/99 A, 65 A, 29 A, 65/160, 162, 163, 164, 29

[56] References Cited
UNITED STATES PATENTS

| | | | |
|---|---|---|---|
| 3,223,502 | 12/1965 | Ward et al. | 65/162 X |
| 3,764,285 | 10/1973 | Matesa et al. | 65/99 A |
| 3,779,731 | 12/1973 | Pollock et al. | 65/29 A |

Primary Examiner—Arthur D. Kellogg
Attorney, Agent, or Firm—E. Kears Pollock

[57] ABSTRACT

The rate at which a continuous sheet of flat glass is manufactured by a float process is controlled by regulating the position of a tweel in a channel or canal used for delivering molten glass for forming in response to the temperature of the molten glass and in response to directly detected width, thickness and speed of the continuous sheet of glass being conveyed from the forming process.

9 Claims, 2 Drawing Figures

MANUFACTURE OF FLAT GLASS AT CONTROLLED THROUGHPUT RATE

BACKGROUND OF THE INVENTION

This invention relates to the manufacture of flat glass by a process of floating glass on molten metal while forming it into a continuous sheet or ribbon of glass. More particularly, this invention relates to improved methods of controlling such processes.

In the various methods of making flat glass by floating it on molten metal during forming, molten glass is delivered onto the surface of a bath or pool of molten metal, such as tin, and this glass is formed into a dimensionally stable, continuous sheet or ribbon of glass by advancing it along the surface of the pool of molten metal while cooling it and applying attenuation forces to it. Following formation of a continuous sheet of glass, the glass is removed from its supporting molten metal and conveyed to and through an annealing lehr to anneal the glass. The glass is then cut into pieces of selected size for further processing and sale. See U.S. Pats. No. 710,357, No. 789,911, No. 3,083,551 and No. 3,843,346 for descriptions of several processes for making flat glass to which this improvement may be applied.

Flat glass made by any of these processes may be made in a wide range of thicknesses and widths and at substantially diverse rates depending upon the size of a chamber in which it is produced and upon the thermal and mechanical force conditions imposed upon the glass while it is being supported and formed on molten metal. Under equilibrium conditions and in the absence of accelerating or attenuating forces acting on the glass, a sheet of glass having a thickness of about 6 – 7 millimeters is produced. This is characterized as an "equilibrium thickness." Glass may, of course, be made having a thickness that is greater or less than equilibrium thickness.

In general, to obtain a final glass thickness which is greater than equilibrium thickness, it has been the practice to place restrictor elements on either side of the ribbon of glass at a point and at a location within the bath chamber where the glass is sufficiently hot to behave as a viscous liquid. In order to make glass having a thickness which is less than equilibrium thickness, there have been practiced two alternative techniques: one technique is to discharge the molten glass onto a tin bath at a discharge rate which produces a relatively wide body of molten glass and to apply attenuating forces to the glass along its direction of travel by substantial acceleration of the ribbon due to high speed operation of the driving rolls and lehr rolls downstream in the process; a second method is used to discharge glass at a sufficiently high discharge rate to provide for a body of molten glass which is substantially wider than the intended final ribbon width and to apply lateral attenuation forces to the ribbon by edge rolls or the like, in addition to supplying attenuation forces in the direction of ribbon travel so that the ribbon is steadily made narrower as its thickness is reduced.

In the making of equilibrium thickness glass and thinner than equilibrium thickness glass by the float process, substantial attenuation of the ribbon causes a decrease in ribbon width corresponding to travel downstream through the bath chamber. Though the effect is less pronounced in making thicker glass, some attenuation occurs in its manufacture also. A variety of forces and properties affect the ultimate thickness and width of a ribbon of flat glass. Among the forces affecting glass width and thickness are the axial or longitudinal attenuating forces which are imposed by the pulling of the cooled, rigid glass passing out of the float bath and through the annealing lehr, the lateral or sideward pulling or pushing of edge attenuators or restrictors, respectively, the pushing force of additional molten glass being discharged from the melting and refining furnace into the float bath and the downward forces of gravity and atmospheric pressure acting upon the floating ribbon of glass. Properties which affect the ultimate width and thickness of a float-formed glass ribbon include the density of the glass, the surface tension of the glass-metal interface, the viscosity of the glass and the variation of these properties and the flow conditions of the underlying metal due to thermal effects and variations existing throughout the float bath chamber.

Ordinarily, a continuous ribbon or sheet of glass, after being annealed and cooled, is cut into useful piece sizes. By a series of tranverse cuts, the continuous sheet is partitioned into a plurality of large discrete sheets known as "uncuts" or "lehr ends." Marginal edges of the sheets are ordinarily cut away or trimmed from the sheets and returned as cullet to the glass melting furnace. The trimmed glass sheets are then cut into smaller pieces of desired sizes for sales and ultimate use. Desirably, the width and length of each trimmed sheet is such that a combination of desired size pieces may be cut from it without having excessive waste or trim. If the width of the sheet of glass is not precisely controlled, it is necessary to operate with a target width that is sufficiently greater than that required to yield no waste or trim so that narrowing variations in width can occur without yielding a ribbon too narrow to permit cutting a discrete number of desired sizes from it since waste will sharply increase if fewer pieces must be cut from the sheet.

With respect to the thickness of the glass, any given end use of glass has some specified glass thickness and in order to accommodate occasional uncontrolled variations in thickness such a specified thickness will admit to a variation about the specified thickness within some acceptable range. To the extent that the glass thickness can be more precisely controlled, it is possible to operate with a target thickness closer to the acceptable minimum thickness. This serves to save manufacturing costs as less glass needs to be melted, refined and formed to yield a commercially equivalent amount of glass. For example, if glass having a nominal commercial thickness of 7/32 inch (5.5 mm) is permitted by commercial standards to have any thickness, it is considerably more efficient to have a production target that is the nominal thickness less two thousandths inch rather than the nominal thickness itself. This lower production target is only feasible if control is sufficiently precise so as to insure that uncontrolled variation will not exceed three thousandths inch rather than a less precise control of five thousandths inch which would require a production target identical to the nominal thickness. Such an apparently small change can be economically significant, for in a facility making about 400 tons of glass per day each saving of one thousandths inch of glass thickness yields a capacity potential for producing glass at a rate of more than 1000 additional square feet of glass per day The precise control of glass thickness and width have, thus, been matters of considerable interest and importance in the art of glassmaking. Exemplary patents illustrating this are U.S. Pat. No. 3,531,274 to Dickenson et al and U.S. Pat. No. 3,764,285 to Matesa et al. In general, the control schemes of the past have been successful in terms of controlling the variable, thickness or width, which has been the particular objective of each control scheme. It has been recognized that each control scheme is conveniently operated to ignore certain realities in order to provide simple and reliable control of the variable over which control is desired. Thus, it has been convenient to precisely control the thickness of a continuous sheet of glass by controlling thermal and attenuating force conditions in a forming chamber and permitting some variation in the width and speed of the sheet of glass to accommodate the thickness control. It has alternatively been convenient to control the width of a continuous sheet of glass by varying the rate at which molten glass is delivered for forming while permitting some variations in glass thickness and speed to accommodate the width control.

It is an objective of this invention to precisely control the mass throughput of a glassmaking process so that both the thickness and width of the continuous sheet being produced can be precisely controlled to strict tolerances. As a result of practicing this invention loss of production capacity and waste of glass due to varying and excessive trim and cutting losses and due to excessive glass thickness are substantially reduced.

SUMMARY OF THE INVENTION

Flat glass is formed in a process which is controlled to produce a glass ribbon at a uniform mass rate or throughput with the ribbon preferably being one of uniform width and uniform thickness. The control accommodates variations in the temperature of molten glass being delivered for forming and accommodates the wear of refractory elements comprising a flow channel through which the molten glass is delivered. The process is controlled in a manner such that variations in conditions in a chamber (such as pressure variations) in which the glass is formed do not detrimentally affect the precision with which the process is controlled.

Molten glass is discharged from a glass melting and refining furnace either through a canal or over a threshold onto a pool of molten metal, such as tin, contained in an enclosed forming chamber. The molten glass may be poured from a canal downwardly over a lip onto the molten metal or delivered directly onto the molten metal as a flowing layer of molten glass. The rate at which the molten glass enters the chamber is governed by the size of an opening through which the molten glass flows. The opening size is dependent upon the height of a gate or tweel which is translatably engaged with a flow channel (either a canal having a bottom and side walls or a threshold with jambs at its ends). This invention relates particularly to an improved method for controlling the height of such a tweel as will be noted in detail below.

Following delivery onto the pool of molten metal, the glass forms (if delivered by pouring) or already is a floating layer or body of glass which is advanced along the surface of the pool of molten metal away from the location of glass delivery. As the layer or body of glass advances along the surface of the pool of molten metal, it is gradually cooled and attenuating forces are generally applied to it.

The forces applied to the glass are sufficient to maintain the advance of the glass and to cause it to assume a desired thickness and width before being cooled to a temperature at which its dimensions become fixed. There may be both longitudinal and transverse forces applied to the glass. Longitudinal forces are generally applied to the glass by the action of conveying rolls at the exit end of the forming chamber. These rolls support and convey the formed sheet of glass from the chamber. By conveying the formed sheet of glass from the chamber at a sufficient rate the tractive forces applied to it are transmitted through the glass itself to hotter, less viscous glass in the chamber, and that glass, unable to support the forces, yields and is stretched or attenuated to a lesser thickness and width. If transverse forces are applied to the glass, its width may be maintained constant or at some width greater than that attained if only longitudinal forces are applied to the glass. Transverse forces are applied by gripping or otherwise holding the opposite marginal edges of the advancing layer of glass and either applying positive outward forces to it or simply resisting its tendency to pull inwardly on itself. Suitable means for applying outward forces are outwardly angled edge rolls, contacting the top surface of the glass and driven to impart outward tractive forces to it.

As discussed with reference to the prior art, workers skilled in the art of glass manufacture have adjusted the longitudinal and transverse forces applied to glass to control its width and thickness during forming. These conventional control practices are beneficially carried out in conjunction with the practice of this invention. In the present method the mass rate or throughput of molten glass delivery for forming is strictly controlled so that the width and thickness of a formed sheet of glass can be controlled in the forming process itself without having control actions obscured by uncontrolled variations in the throughput of the process.

To accomplish precise throughput control, several process variables are periodically detected to provide signals upon which control actions may be predicated. The temperature of molten glass to be delivered for forming is detected just prior to or just after passing beneath the tweel. This temperature is preferably detected upstream of the tweel, prior to delivery, in order to provide a feed forward contribution to the control action. In a process involving the delivery of molten glass from a fossil fuel-fired furnace in which firing reversal occurs, as in a common regenerative furnace, care is to be exercised in the detection of the molten glass temperature since momentary sharp declines occur during firing reversals. Practice of the preferred embodiment of this invention contemplates a solution to this problem as will be discussed below.

In addition to detecting the temperature of the molten glass being delivered for forming, the width, thickness and longitudinal or linear speed of the formed sheet of glass are all periodically detected. These variables are preferably detected just after the formed sheet of glass is withdrawn from the forming chamber. By directly detecting the values of these three variables which, with the density of the glass (relatively invariant), conclusively define the throughput of a flat glassmaking process, it has been possible to avoid the ambiguities inherent in prior control schemes. For example, in the absence of such direct detection, it has been possible to observe width variations and adjust the tweel when the width variation was, in fact, caused by a variation in glass temperature within the forming chamber or to adjust the angle on an edge machine in the forming chamber when, in fact, the width variation had been caused by a variation of the incoming molten glass temperature or by a wearing away of the tweel. By the present technique the rate of molten glass delivery is strictly controlled to give a controlled throughput; however, the width, thickness and speed may vary among themselves to yield a constant or otherwise controlled product representing the throughput. It is then possible to exercise known forming control techniques confident that their effectiveness is not obscured by unwanted throughput variations. As a result, more precise control can be exercised over the width and thickness of a finished ribbon or sheet of glass.

The control action, which is exercised in this method, is basically a proportional control of a tweel setpoint depending upon the temperature of molten glass being delivered past the tweel with the control action modified by a glass temperature setpoint generated by conventional three-mode feedback control of the throughput of the process. The proportionally generated tweel setpoint signal is employed to modify a conventional three-mode or on-off feedback control of tweel position based directly upon a detected tweel position or opening.

Following this control action through its sequence of novel steps, it comprises, in addition to the variable detection steps already described and the generation of signals representing those detected values, the steps of: combining the width, thickness and speed signals to generate a throughput representative signal; comparing this throughput signal with a predetermined setpoint for throughput and, responsive to that, generating a first control signal, which is, in effect, a glass temperature setpoint; comparing the glass temperature signal (or a filtered signal as described below) with the first control signal and, responsive to that, generating a second control signal, which is, in effect, a tweel position setpoint; and controlling the tweel position responsive to the second control signal employing a conventional tweel control loop for the immediate control of the tweel itself.

The devices employed to detect the values of the several process variables which are detected in the practice of this invention are conventional detection devices. The molten glass temperature may be detected using a thermocouple sheathed in a ceramic tube and immersed in the molten glass or using a radiation pyrometer, such as, for example, a Radiamatic ™ radiation pyrometer sold by Honeywell, Inc., Washington Park, Pennsylvania. The width of the continuous sheet of glass may be detected using a pair of glass edge detection devices, such as described in U.S. Pat. No. 3,794,477, or using single-line television scanners or servo-mechanical edge followers. The thickness of the continuous sheet of glass may be monitored using an X-ray gauge, such as a Bendix™ thickness gauge sold by Bendix Corporation, Automation and Measurement Division, Dayton, Ohio. For a complete description of such a device used to measure hot glass thickness, see "Measuring the Thickness of Hot Float Glass," GLASS, April 1974 at page 155.

The controllers employed to carry out the present control method may comprise conventional analog or digital controllers. Typical electric or pneumatic analog controllers having conventional, three-mode capability may be conveniently used. It is, nevertheless, most convenient to employ a digital computer to provide all controller functions. When employing a digital computer, analog-to-digital signal conversions may be required and may be accomplished using known commercial techniques and devices. A digital computer such as a FOX-2™ digital computer sold by Foxboro Instrument Company of Foxboro, Massachusetts, may be used.

The tweel position detection and immediate tweel control are preferably effected in the manner and using facilities such as described in U.S. Pat. No. 3,764,285 (See FIG. 3 of that patent). The specific descriptions of preferred devices and techniques contained in U.S. Pats. No. 3,764,285 and No. 3,794,477 are incorporated by reference herein.

As mentioned briefly above, the temperature of molten glass about to be discharged from a regeneratively fired glass melting and refining furnace is subject to periodic drastic change during firing reversals. Control actions, if based directly upon such a temperature, could be erratic. Thus, in the preferred embodiment of this invention a filtering of the glass temperature signal is employed. This eliminates any effect of firing reversals upon throughput control actions.

In order to properly filter the glass temperature signal, the signal is observed over an extended time. Temperature spikes (sudden, drastic variations) do not necessarily occur in directly correlated phase with firing reversals. For example, with a steady ten-minute period between reversals, glass temperature spikes were observed for one furnace to shift alternately from nine to eleven minutes apart. Such performance is simply an artifact of a given furnace without apparent explanation so that for any given furnace, attention must be given to tuning this or any control method to that given furnace. Irrespective of the idiosyncrasies of a given furnace, the present control method may be effectively employed when detected glass temperatures are simply filtered. This is done by using an exponential filter which receives a series of signals representing detected temperatures and generates a smoothed temperature signal according to a relationship wherein the smoothed temperature signal equals the last detected temperature signal plus the current error in the filter model less the moving average of the series of signals times the error in the filter model at the last detected time. This technique utilizes the principles described in *Time Series Analysis, Forecasting and Control*, Box, G.E.P. and G. M. Jenkins, Holden Day, San Francisco, 1970. This filter model has the effect of disregarding all temperature spikes caused by firing reversals.

The filtered glass temperature signals are directed to an analog controlled or digital computer acting as a controller. Each filtered glass temperature signal serves as a setpont to a controller for the tweel control. The control is preferably a feed forward, proportional-only function. The filtered glass temperature is combined with a first control signal generated in a throughput loop to yield a second control signal which sets the target or setpoint for the tweel height. The preferred method for combining these signals is to compare them with the first control signal being treated as a glass temperature setpoint (in essence a dynamic setpoint in this method). The difference between the signals then represents an error signal representing the deviation of the filtered temperature from the setpoint temperature. Using a proportional-only control mode, this error signal is multiplied by the proportional gain (which may be adjusted to tune the system) of the controller to yield the second control signal.

The second control signal, in turn, is treated as a dynamic setpont. In this instance it is a setpoint for a conventional feedback control loop serving the tweel itself. In this loop the tweel height is detected and a signal representing the height generated; this signal is compared with one representing a setpoint for the tweel height and an error signal representing their difference is generated. Using conventional feedback control, a control signal to move the tweel either upwardly or downwardly is generated from the error signal. In order to prevent unrestrained movement of the tweel, the control signals are incremental. Each control signal is one to move the tweel upwardly an increment, downwardly an increment or not at all. The control signals may be, and preferably are, discrete pulses which are directed to an electric drive mechanism which actually moves the tweel.

BRIEF DESCRIPTIONS OF THE DRAWINGS

The present invention will be further understood with reference to the accompanying drawings.

FIG. 1 is a schematic longitudinal section of a glassmaking apparatus illustrating the control devices employed with it to practice this invention and FIG. 2 is a schematic block diagram representing the controlled glassmaking process according to this invention.

DESCRIPTION OF THE PREFERRED EMBODIMENTS

Figure 1:
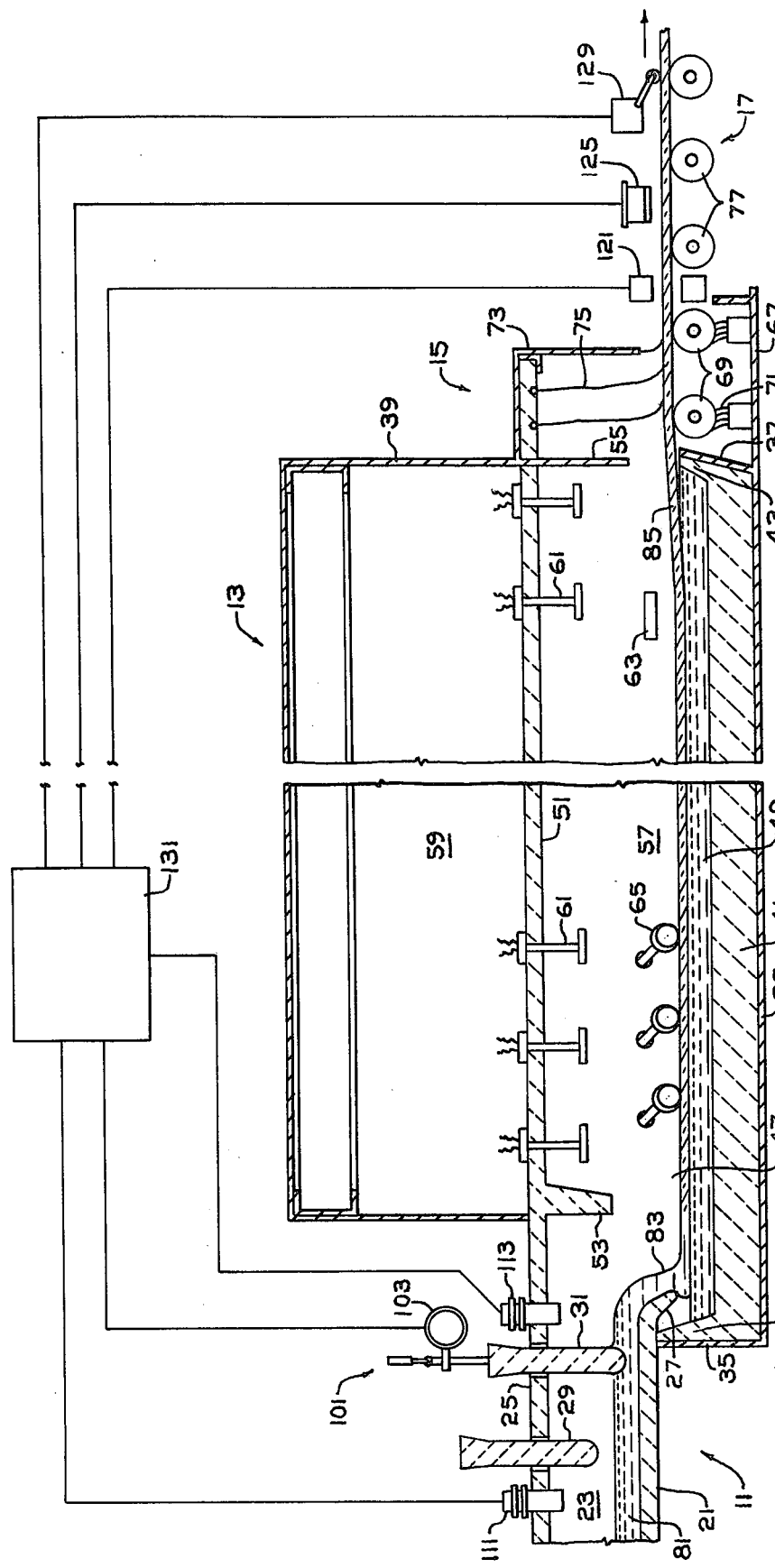

The details of the preferred embodiments of this invention may be readily understood from the description which follows making reference to the accompanying drawings:

Referring to FIG. 1 there is shown the discharge end of a glass melting and refining furnace 11 and connected to it a float glass forming chamber 13 which, in turn, has connected to it a glass withdrawal facility 15 and then a conveyor 17 which may be located within an annealing lehr (not shown). At the end of the glass melting and refining furnace is a facility for delivering molten glass from the furnace to the glass forming chamber 13. In the embodiment illustrated in FIG. 1 the glass delivery facility comprises a canal having a bottom 21, side walls 23 and a roof 25. Extending into the forming chamber from the bottom 21 is a lip 27. Mounted within the canal are tweels, a backup tweel 29 shown in a raised position and a control tweel 31 shown in a lowered position engaging molten glass for controlling its rate of delivery to the glass forming chamber 13.

The glass forming chamber 13 comprises a bottom casing 33, an inlet end casing 35, an outlet end or exit lip casing 37 and an upper casing 39. Mounted within the open-top box formed by the bottom casing and outlet casings, along with side casings not visible in FIG. 1, is a forming chamber bottom 41 having an exit lip 43 and an inlet refractory wetback 45. The lower portion of the forming chamber is also provided with side walls 47 which, together with the bottom 41, the exit lip 43 and the wetback 45, form a container which is partially filled with a pool of molten metal 49, preferably tin or an alloy of tin. Spaced above the pool of molten metal 49 and overlying the bottom portion of the forming chamber between the side walls 47 and extending from the inlet to the outlet end of the forming chamber is a ceiling or a roof 51. At the inlet end of the chamber the ceiling or roof 51 rests on a lintel 53 which extends slightly downwardly from the ceiling and across the inlet end of the forming chamber. A barrier or casing section 55 extends downwardly toward the pool of molten metal and provides a limited space through which glass may be removed from the forming chamber. The space between the molten metal 49 and the ceiling 51 is called a headspace 57 and the space above the ceiling 51 within the upper spacing 39 is a plenum or service space 59. Heating elements 61 are mounted in the ceiling 51 and extend into the headspace 57. These are provided for controlling the thermal conditions within the headspace in order to properly condition glass during forming. Extending into the headspace 57 is a cooler 63 also used to thermally condition glass during forming. In order to apply tractive forces to glass during forming and to apply outward lateral forces to glass, there are provided along the sides of the forming chamber edge rolls 65 or other devides which extend into the headspace 57 of the chamber through side walls 47.

At the exit end of the forming chamber there is provided the glass withdrawal facility 15. It includes an extension of the bottom casing providing a well 67 containing exit or liftout rolls 69 which are mounted across the width of the forming chamber on axles connected to means (not shown) for rotating the rolls 69. The rolls 69 are mounted adjacent to sealing means 71 which are employed to retard or prevent the ingress of air from the outside environment past the rolls and into the enclosed forming chamber 13. The upper portion of the glass withdrawal facility includes an upper casing for shell 73 having mounted within it drapes 75 or other sealing devices that engage or are closely spaced from glass as it is lifted from or withdrawn from the forming chamber. Extending beyond the glass withdrawal facility is a conveyor 17 including conveyor rolls 77 mounted for operation in the usual manner. During operation molten glass 81 flows from a pool of molten glass in the glass melting tank beneath the operating tweel 31 and over the lip 27 downwardly as a stream of molten glass 83 onto the pool of molten metal 49 in the enclosed forming chamber. This glass flows along the surface of the pool of molten metal forming a layer of glass which is cooled as it is advanced along the surface of the pool of molten metal to form a continuous sheet 85 which is then lifted from the pool of molten metal and withdrawn from it by the liftout roll 69 and then conveyed along conveyor roll 77 through an annealing lehr (not shown). As the glass advances through the forming chamber, it is gradually cooled as longitudinal and lateral forces are applied to it by liftout rolls 69 and edge rolls 65. In this way it is attenuated to a desired width and thickness. The angle and speed of rotation of the edge rolls 65 may be controlled in a conventional manner to adjust the thickness of the glass being formed. The number of coolers 63 placed in the chamber and rate of using these coolers may be varied to control thermal conditions in the chamber. The power applied to heaters 61 may be adjusted in a conventional manner to further control thermal conditions in the chamber. By such thermal control the thickness and width of the continuous sheet of glass being produced may be adjusted and maintained as desired. In order to ensure that such conventional control actions are not counter-productive, the present invention provides for precise control of the throughput of the process by precisely controlling the rate at which the molten glass passes beneath the tweel 31.

The control tweel 31 is provided with a tweel height control facility 101 such as described in U.S. Pat. No. 3,764,285 764,285 at Col. 8 beginning at line 9 and extending through Col. 9, line 13. The material from that patent describing a conventional tweel height control apparatus and its operation along with FIG. 3 of that patent are incorporated herein by reference. The actuator of the tweel height control apparatus is a motor 103 which is shown in FIG. 1 connected to the controller 131 employed in the practice of this invention which will be described later. In the practice of this invention, a molten glass temperature detector, preferably a radiation pyrometer 111, is provided just upstream of the tweel 31. For convenience and easy access it is preferably located upstream of backup tweel 29, as shown. This temperature detector is employed to detect the temperature of molten glass being discharged from the refiner of a glassmaking tank. In an alternate embodiment of this invention molten glass temperature may be detected just downstream of the operating tweel 31 by a temperature detector, preferably a radiation pyrometer 113 which views molten glass as it flows over the lip 27 and onto the molten metal 49 within the forming chamber. Beyond the exit end of the forming chamber there are provided facilities for detecting the thickness, width and speed of the continuous sheet of glass being withdrawn and conveyed away from the forming chamber. A thickness detector 121 extends transversely across the conveyor in order to periodically provide a signal representative of the thickness of the glass at selected points or at all points across the width of a continuous sheet of glass being conveyed along the conveyor. A preferred device for detecting the thickness of the glass continuously across its width is an X-ray gauge as described above. A pair of glass edge detectors 125 are employed in tandem to detect the positions of the two edges of a continuous sheet of glass being conveyed from the forming chamber. By combining the signals of such edge detectors a signal representative of the width of the continuous sheet of glass is readily generated. A suitable manner for combining signals of such edge detectors is described in U.S. Pat. No. 3,764,285 at Col. 6, beginning at line 41 and extending through Col. 7, line 51, which material is incorporated herein by reference. There is also provided a speed detecting device, preferably a tachometer 129 which continuously detects the speed of a continuous sheet of glass being conveyed from the chamber and generates a signal representative of that speed. Any conventional tachometer is suitable for this purpose. The detectors 111, 121, 125 and 129 are individually connected to a controller such as a digital computer 131 which is, in turn, connected to the motor actuator 103 of the tweel height control apparatus 101. Alternatively as stated above, each individual detector may be connected to an individual analog controller with the analog controllers approximately connected to one another in order to accomplish the same function as the digital computer 131.

Figure 2:
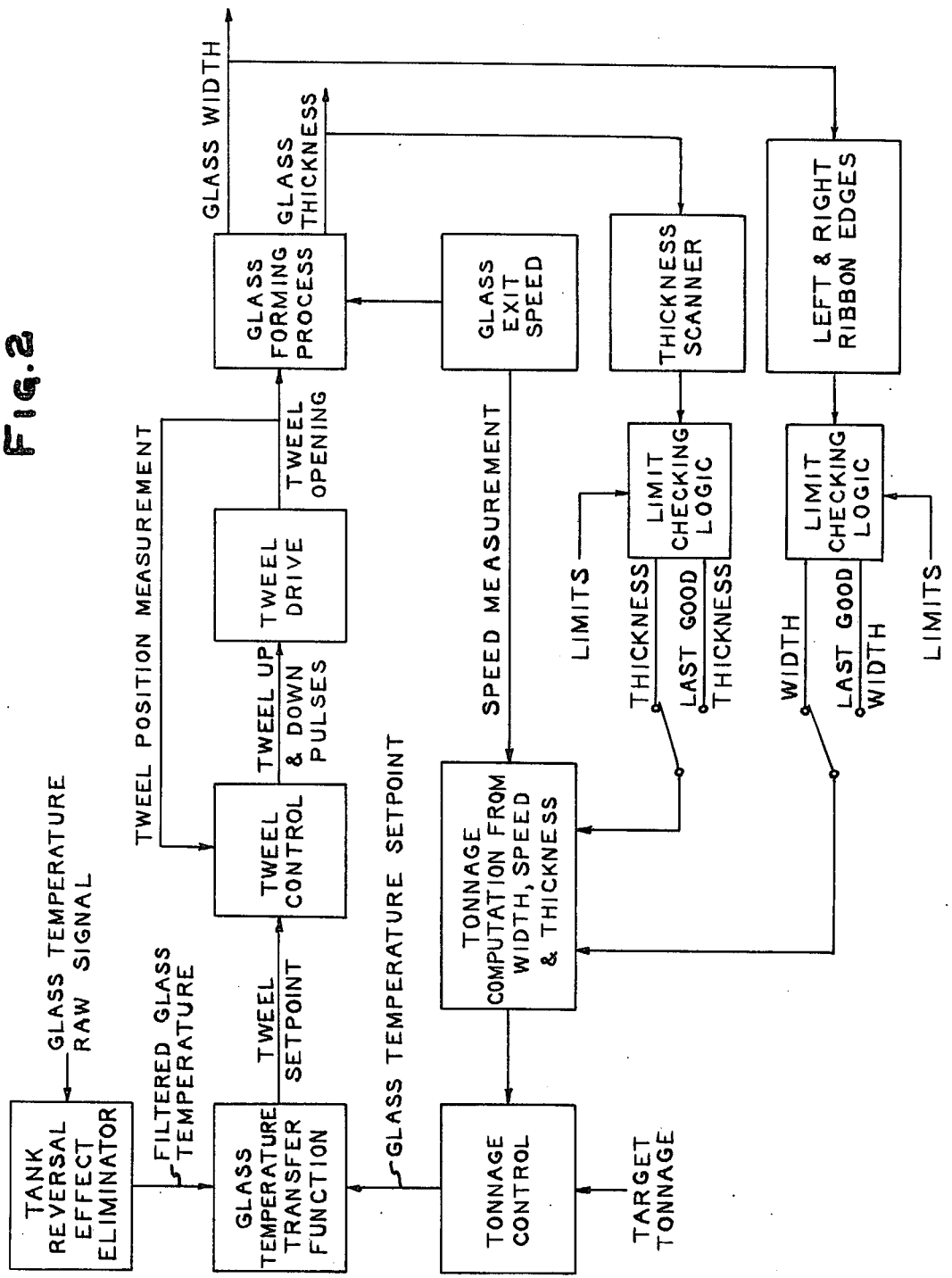

Now with reference to FIG. 2 in addition to FIG. 1, the steps of the present method will be described. The glass forming process itself is shown schematically as a single block. The glass forming process in common process control terminology is visualized as an operation having certain inputs and certain outputs. Physically, of course, its input is a stream of molten glass and its output is a continuous sheet of glass. In a dynamic process control sense, its input may be represented by a tweel opening which directly governs the rate at which molten glass is delivered to the glass forming process and its outputs are a glass width, a glass thickness and a glass speed, all representative of the conditions of the continuous sheet of glass coming from the process itself. In the operation of such a glassmaking process, the tweel position is controlled by closed control loop acting upon the tweel actuator. In this closed loop tweel height, which corresponds directly to the tweel opening, is periodically detected as indicated by the tweel position measurement portion of the loop described and shown. This may be done by engaging a linear potentiometer with a member mounted and fixed to the tweel support mechanism. Such a device continuously generates a signal which is proportional to the height of the tweel and thus proportional to the size of the tweel opening through which molten glass is delivered. A tweel setpoint is provided to a controller which is preferably a conventional on-off controller. For conventional operations the setpoint would be manually provided and might be periodically varied depending upon desired changes in the throughput of the process. During operation the tweel position measurement is compared with tweel setpoint and their difference is represented by an error signal which is generated by the controller itself. Then, responsive to this error signal, control signals are generated. Control signals may each be a fixed incremental voltage to cause the tweel actuator or drive to lift the tweel upwardly a fixed incremental amount, to drive it downwardly a fixed incremental amount or to take no action in the instance where, due to a desired dead band in the control loop, no pulse, either positive or negative, is generated by the tweel control. Thus it may be seen that in conventional control, responsive to a static or constant tweel setpoint and responsive to a measured tweel position, the tweel is periodically adjusted so that no error exists between the tweel setpoint and the measured tweel position. In the conduct of this invention a dynamic tweel setpoint is provided, rather than a static one, and this dynamic setpoint, in a form of a control signal, is periodically generated in a manner which accommodates either random or deliberate variations in the temperature of molten glass being delivered. This is particularly significant since as glass temperature increases, its viscosity decreases dramatically and for a given tweel opening substantially more glass will flow through the opening if the temperature of the glass is higher than if it is relatively lower. Also as will be seen, the present control method also accommodates variations in the tweel opening which would not be detected by a tweel position measurement, for example, increase in the opening that are due to the wearing away of either the tweel 31 or the canal bottom 21.

In order to provide a dynamic setpoint for the tweel control, the temperature of the molten glass 81 upstream of the tweel 31 is detected by a radiation pyrometer 111. This provides a raw signal of the glass temperature which in a preferred embodiment is directed to the digital computer 131. In the digital computer there is provided an exponential filter which acts as a tank reversal effect eliminator when the glass is being melted and refined in a conventional regenerator glassmaking furnace. In the filter a filtered glass temperature is generated according to the following relationship: the filtered glass temperature signal is generated to equal the last previous filtered glass temperature signal times a constant less unity divided by the constant plus the reciprocal of the constant times the unfiltered glass temperature signal. The constant is preferably in the range from 20 to 30, and most preferably is 24, in a process using a glass furnace of ordinary commercial size. This may be expressed mathematically as:

Filtered Temperature = (N-1/N [(Last value for FIltered Temperature) + (1/N) (Unfiltered Temperature)]

Since the filter acts upon a previous output of the filter, an initial value is required when control is first initiated. An arbitrary signal may be used or preferably the unfiltered temperature may be used to initiate the control. When the initial value is the unfiltered value, the filtered temperature is initially equal to the unfiltered temperature. It then, on the next control cycle, is properly filtered.

The filtered glass temperature, in effect, ignores sudden decreases in detected glass temperature which corresponds to reversals of the furnace when firing is stopped in order to reverse the direction of fuel/air and exhaust flows through the furnace and its regenerators. The filtered glass temperature signal then is directed to a controller characterized as a glass temperature transfer function in FIG. 2 which generates a control signal serving as the dynamic tweel setpoint. The glass temperature transfer function preferably provides proportional-only control wherein the dynamic tweel setpoint control signal is generated to be proportional to the filtered glass temperature signal according to the following relationship: the newly generated tweel setpoint is set equal to the last previous tweel setpoint less a proportionally constant times the difference of the current glass temperature signal (filtered preferably) less the last previous glass temperature signal (filtered if the current one is). The proportionality constant is preferably ln the range from 0.005 to 0.030 inch/° F (0.025 to 0.15 cm/° C). In a facility of ordinary commercial size wherein the molten glass is delivered through a channel about 40 inches (1.02 meter) wide at a rate of about 400 tons per day, the constant is conveniently set at about 0.012 inch/° F (0.060 cm/ C).

The portion of the control already described would alone offer some improvement in the control of a conventional glassmaking process. Whether or not the controller for generating a tweel setpoint would provide precise throughput control, that controller is provided with a setpoint that accounts for variations in molten glass temperature. However, in order to provide for precise throughput control of the process, a glass temperature setpoint is provided and that glass temperature setpoint is a dynamic setpoint provided as a control signal generated from a throughput control loop which will now be described.

the left and right ribbon edges are periodically detected by edge detectors 125, and a signal representing the width of a continuous sheet or ribbon of glass is generated. In a preferred embodiment in order to eliminate the possibility of instrument error, the controller is provided with limit checking logic. Since the continuous sheet of glass has some range of possible widths and since it is unlikely to have a width outside that range, those predetermined limit widths are provided to the controller as a limit checking logic. The limit checking logic compares the generated width signal with the predetermined limit widths which are provided to it, and, if the generated width signal is within that range, it is directed to the portion of the controller designated "tonnage computation from width, speed and thickness" in FIG. 2. If the generated width signal is outside the range of the predetermined limits, the last detected width within that range is directed to the tonnage computation element of the controller.

In a similar manner the thickness of the continuous sheet of glass is detected by the thickness detector 121 and a signal representing the average thickness of the continuous sheet of glass is generated and it is compared with a predetermined range by a limit checking logic, and, if satisfying that test, the signal is directed to the tonnage computation element of the controller. If the detected thickness does not satisfy the test, the last generated thickness signal satisfying the test is directed to the tonnage computation element of the controller. The glass speed is detected using the tachometer 129 and a signal is generated representing that speed. The speed signal, the thickness signal and the width signal are multiplied together in the controller to generate a signal representative of the throughput of the process. If desired, the product of these signals may be multiplied by a constant representative of the density of the glass and all necessary conversion factors so that the throughput signal directly represents the throughput in terms of tons per day. This signal may be employed to periodically print or otherwise display the throughput in terms of tonnage which may be read by a process operator. Whether or not the produce is so converted to a signal directly representative of throughput in terms of tonnage, the signal is representative of the throughput and may be employed in the generation of a control signal. In the computer or controller for generating a control signal, the signal representative of the througput or tonnage is compared with a predetermined target throughput or tonnage and, responsive to that comparison, a control signal is generated. A control signal is preferably generated according to conventional three-mode conrol. The throughput signal is compared with a predetermined target throughput or tonnage generating an error signal which is representative of the difference between the signals. With the error signal serving as the variable in a three-mode control model, a control signal (designated in FIG. 2 as a glass temperature setpoint) is generated according to the following relationship: the glass temperature setpoint is generated to equal a gain or proportionality constant (preferably from 0.1° to 1.0° F/ton per day throughput) times the sum of three terms. The three terms are the throughput error signal, namely the throughput signal as currently generated less the targed throughput signal (in tons per day); the reset constant (preferably from 2 minutes to 30 minutes) times the difference of the current generated throughput signal less the last previous generated throughput signal further times the time between such generated throughput signals; and the derivative function which in the practice of this invention is conveniently zero.

This may be expressed mathematically as follows:

Temperature Setpoint = Gain [(Throughput Signal — Targer or Setpoint of Throughput) + 1/Reset (Throughput Signal — Last Throughput Signal) (time between signals)]

In a preferred practice, when making about 400 tons per day of flat glass in a conventional float forming facility, the gain is about 0.3° F/ton per day and the reset is about 5 minutes with periodic control actions occuring about once every ten minutes.

The control signal then serves as a dynamic glass temperature setpoint for the glass temperature controller which, in turn, generates a dynamic tweel setpoint, responsive to the comparison of the first control signal and the filtered glass temperature. The dynamic tweel setpoint then is employed for controlling the tweel position as already described.

Although this invention has been described with reference to particular embodiments, those skilled in the arts of glassmaking and process control will recognize that there will be other specific embodiments within the scope of the invention as defined by the following claims.

We claim:

1. In the method of stabilizing the volumetric flow of molten glass in making flat glass comprising the steps of discharging molten glass of varying temperature through an opening defined by a channel and a movable tweel having its position adjusted and maintained to control the size of the opening; flowing the discharged molten glass onto a pool of molten metal in an enclosed forming chamber; advancing the glass along the surface of the pool of molten metal while cooling it and while applying forces to it to form a dimensionally stable, continuous sheet of glass; withdrawing the formed continuous sheet of glass from the pool of molten metal and from the enclosed forming chamber; and conveying the continuous sheet of glass therefrom; the improvement which comprises periodically controlling the volumetric throughput of glass wherein all signals are in common physical units and during each control period the control comprises:
   a. detecting the width, thickness and speed of the continuously formed sheet of glass and generating representative width, thickness and speed signals responsive to said detection;
   b. detecting the temperature of the molten glass in the vicinity of the tweel and generating a glass temperature signal responsive thereto which glass temperature signal is representative of the viscosity of the molten glass in the vicinity of the tweel;
   c. generating a throughput signal representative of the volumetric throughput of molten glass through the opening defined by the tweel and channel by combining said width, thickness and speed signals as a product of said width, thickness and speed signals;
   d. detecting the difference between said throughput signal with a predetermined throughput signal representative of a desired throughput and generating a first control signal responsive to said detected signal difference;
   e. detecting the difference between said glass temperature signal with said first control signal and generating a second control signal equal to a second control signal generated during the previous control period less a fixed factor of said detected signal difference which is related to a ratio of incremental tweel height change to an incremental glass temperature change; and
   f. adjusting and maintaining the position of the tweel responsive to said second control signal whereby during each control period a greater tweel opening is provided for glass of increased viscosity and a lesser tweel opening is provided for glass of decreased viscosity.

2. The method according to claim 1 wherein the temperature of the molten glass is detected before the molten glass is discharged through the opening.

3. The method according to claim 1 wherein the tweel position is adjusted and maintained to maintain the throughput of molten glass substantially invariant and wherein, while the glass is advanced along the pool of molten metal, it is cooled at a rate sufficient and forces are applied to it in sufficient amount to form a dimensionally stable, continuous sheet of glass having substantially invariant width and thickness.

4. The method according to claim 1 wherein said step of detecting the width, thickness and speed of the continuous sheet of glass is performed less frequently than said remaining steps.

5. The method according to claim 1 wherein the molten glass is discharged from a regenerative glassmaking furnace and periodic substantial changes of molten glass temperature occur, wherein the method includes the further step of filtering the signal representative of the molten glass temperature by generating a filtered glass temperature signal and wherein said filtered glass temperature signal is compared with said first control signal to generate said second control signal.

6. The method according to claim 5 wherein said filtering of the glass temperature signal comprises generating a filtered glass temperature signal first equal to the last previous filtered glass temperature signal times a constant less unity divided by the constant plus the reciprocal of the constant times the unfiltered glass temperature signal with the constant being between 20 and 30.

7. The method according to claim 1 wherein said detecting of the width, thickness and speed of the continuous sheet of glass are performed immediately following the withdrawing of the continuous sheet of glass from the enclosed chamber.

8. The method according to claim 1 wherein the predetermined throughput signal is changed and the tweel position is adjusted by a plurality of adjustments until being maintained at a substantially fixed position according to said changed predetermined throughput signal.

9. The method according to claim 1 wherein generated width and thickness signals are respectively compared with predetermined range limits and generated signals outside said ranges are replaced by their corresponding last generated signal within said range.

* * * * *